(12) United States Patent
Zhang (10) Patent No.: US 11,863,079 B2
(45) Date of Patent: Jan. 2, 2024

(54) SWITCHING POWER CONVERTER WITH SECONDARY-SIDE CONTROL

(71) Applicant: DIALOG SEMICONDUCTOR INC., Campbell, CA (US)

(72) Inventor: Xiaoyong Zhang, Campbell, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 197 days.

(21) Appl. No.: 17/363,889

(22) Filed: Jun. 30, 2021

(65) Prior Publication Data

US 2023/0006565 A1   Jan. 5, 2023

(51) Int. Cl.
*H02M 3/335* (2006.01)
*H02M 1/32* (2007.01)
*H02M 1/00* (2006.01)

(52) U.S. Cl.
CPC ...... *H02M 3/33592* (2013.01); *H02M 1/0009* (2021.05); *H02M 1/32* (2013.01)

(58) Field of Classification Search
CPC .......... H02M 3/33592; H02M 1/0009
See application file for complete search history.

(56) References Cited

U.S. PATENT DOCUMENTS

| | | | |
|---|---|---|---|
| 5,485,361 A | 1/1996 | Sokal | |
| 5,671,131 A | 9/1997 | Brown | |
| 8,054,655 B2 | 11/2011 | Moyer et al. | |
| 8,964,418 B2 | 2/2015 | Atrash et al. | |
| 9,413,255 B2 | 8/2016 | Ohashi | |
| 9,787,194 B2 | 10/2017 | Li | |
| 10,763,752 B1 | 9/2020 | Li | |
| 2006/0176714 A1 | 8/2006 | Yasumura | |
| 2009/0168462 A1 | 7/2009 | Schopfer et al. | |
| 2010/0027298 A1* | 2/2010 | Cohen | H02M 3/33592 363/21.14 |
| 2016/0013723 A1 | 1/2016 | Matthews et al. | |
| 2020/0021197 A1* | 1/2020 | Hari | H02M 3/33576 |
| 2022/0052612 A1* | 2/2022 | Lin | H02M 1/0058 |

FOREIGN PATENT DOCUMENTS

| | | |
|---|---|---|
| CN | 1290993 A | 4/2001 |
| CN | 1404649 A | 3/2003 |
| CN | 101277068 A | 10/2008 |
| CN | 105871214 A | 8/2016 |
| CN | 106411136 A | 2/2017 |
| CN | 107437898 A | 12/2017 |
| CN | 110190754 A | 8/2019 |
| IN | IN542DEL2014 A | 6/2015 |
| JP | 3749579 B2 | 3/2006 |
| JP | 2014166024 A | 9/2014 |
| TW | 1427909 B | 2/2014 |
| TW | 201417487 A | 5/2014 |
| TW | 1542121 B | 7/2016 |
| WO | WO2013047119 A1 | 4/2013 |

* cited by examiner

*Primary Examiner* — Kyle J Moody
(74) *Attorney, Agent, or Firm* — Haynes and Boone, LLP (57) ABSTRACT

A flyback converter with secondary-side control includes a secondary-side controller configured to emulate a primary-winding current. Based upon the emulated primary-winding current, the secondary-side controller signals a primary-side controller through at least one isolation capacitor to switch off a power switch transistor.

16 Claims, 7 Drawing Sheets

SWITCHING POWER CONVERTER WITH SECONDARY-SIDE CONTROL

TECHNICAL FIELD

This application relates to switching power converters, and more particularly to an isolated switching power converter with secondary-side control.

BACKGROUND

An isolated switching power converter such as a flyback switching power converter is typically used to charge a mobile device as the converter's transformer provides safe isolation from AC household current. The power switch for a flyback converter is on the primary-side of the transformer whereas the output voltage and output current for driving a load are produced at the secondary-side of the transformer. This isolation between the output voltage/current and the power switch results in two different control methodologies: primary-only feedback control and secondary-side control.

In primary-only feedback control, a primary-side controller regulates the output power delivery by modulating the switching of the power switch. Since the output voltage and output current are produced on the secondary-side of the transformer, the primary-side controller has no direct knowledge of these parameters. For example, the output voltage cannot be fed back to the primary-side controller through a wire or lead as the isolation is then destroyed. But the primary-side controller cannot regulate the output voltage without some means of measuring the output voltage. In primary-only feedback, the primary-side controller indirectly monitors the output voltage by measuring a reflected voltage such as produced on a primary-side auxiliary winding. Although primary-side feedback thus avoids the need for a secondary-side controller to measure the output voltage and transmit the measured output voltage through an isolating channel such as an optoisolator, the indirect output voltage measurement in primary-only feedback is not as accurate as compared to a secondary-side measurement of the output voltage.

The imprecision in primary-only feedback may be problematic for direct-charging modes for modern smartphones. In such direct charging, the mobile device does not use a DC-DC power converter such as a buck converter to control its battery charging. Instead, it is the flyback converter that directly charges the mobile device's battery in a direct charging mode of operation. The output voltage must then be tightly regulated to avoid damage to the battery. But the imprecision of primary-only feedback may thwart this regulation. In contrast to primary-only feedback, secondary-side regulation directly senses the output voltage. This direct sensing is inherently more accurate than the indirect sensing of primary-only feedback. In addition, secondary-side control has improved loop stability and simplifies the implementation of synchronous rectification.

SUMMARY

In accordance with an aspect of the disclosure, a secondary-side controller for a flyback converter is provided that includes: a control logic circuit configured to generate a power switch transistor off signal responsive to feedback information; and an isolation capacitor driver configured to drive at least one isolation capacitor with the power switch transistor off signal to signal a primary-side controller to switch off a power switch transistor.

In accordance with another aspect of the disclosure, a method of secondary-side control in a flyback converter is provided that includes: generating an emulated primary-winding current responsive to a difference between a drain voltage of a synchronous rectifier switch transistor and an output voltage; generating a power switch transistor off signal responsive to a comparison of the emulated primary-winding current to an error signal; and transmitting the power switch transistor off signal through at least one isolation capacitor to a primary-side controller.

In accordance with yet another aspect of the disclosure, a flyback converter with secondary-side control is provided that includes: a transformer having a primary winding and a secondary winding; a power switch transistor coupled to the primary winding; at least one isolation capacitor; a primary-side controller configured to switch on the power switch transistor responsive to an on signal received over the at least one isolation capacitor and further configured to switch off the power switch transistor responsive to an off signal received over the at least one isolation capacitor; and a secondary-side controller configured to generate the on signal and the off signal, the secondary-side controller being further configured to generate the off signal responsive to an emulated primary-winding current.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Embodiments of the present disclosure and their advantages are best understood by referring to the detailed description that follows. It should be appreciated that like reference numerals are used to identify like elements illustrated in one or more of the figures.

An improved isolated switching power converter with secondary-side control is provided. The advantages include improved transient load response as well as improved integration with secondary functions such as synchronous rectification and zero-voltage switching. In addition, an improved secondary-to-primary communication is provided. The secondary-side controller regulates an output voltage by controlling the switching of a primary-side power switch responsive to both an error signal such as between the output voltage and a desired output voltage and an emulation of the primary-side current conducted through the primary winding of the transformer. The secondary-side controller controls both the power switch on time and the power switch off time through a control signaling through at least one isolation capacitor.

Figure 1:
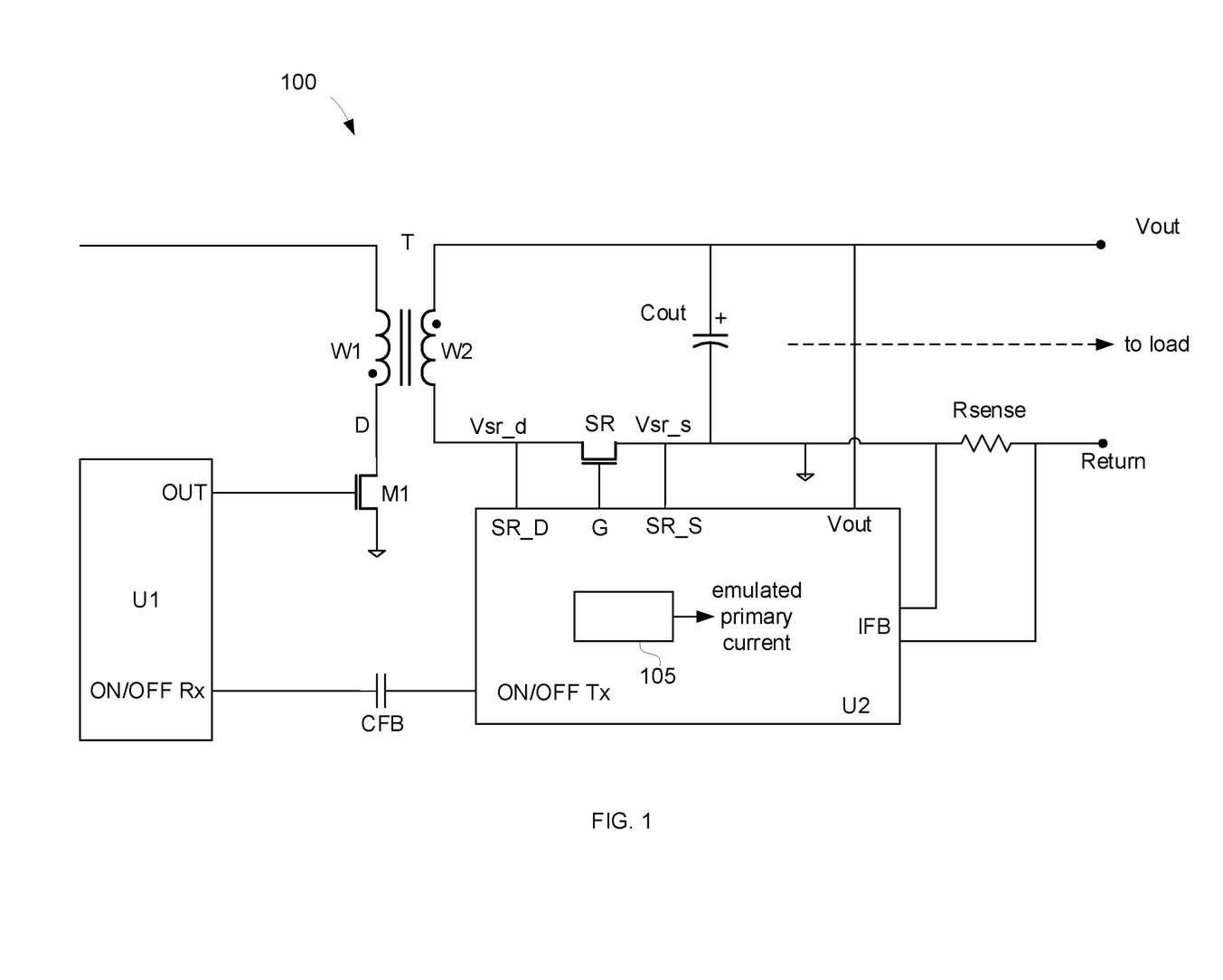
FIG. 1 illustrates a flyback converter with secondary-side control in accordance with an aspect of the disclosure.

An example flyback converter 100 is shown in FIG. 1. A secondary-side controller U2 includes a terminal coupled to an output voltage rail to sense an output voltage Vout. Secondary-side controller U2 includes an emulation circuit 105 that emulates a primary-winding current conducted in a primary winding W1 of a transformer T. The primary-winding current conducts to ground through a power switch transistor M1. A drain (D) of power switch transistor M1 connects to a bottom terminal of primary winding W1. An upper terminal of primary winding W1 connects to an input voltage rail that carriers a rectified input voltage. Secondary-side controller U2 controls the cycling of power switch transistor M1 through on and off control signaling conducted through at least one isolation capacitor CFB. A primary-side controller U1 responds to a cycle-on control signal received over the isolation capacitor by switching on the power switch transistor M1. While the primary winding current conducts through the power switch transistor M1, secondary-side controller U2 keeps a synchronous rectifier (SR) switch transistor off to prevent a secondary winding current from flowing through a secondary winding W2 of the transformer T. The primary-side controller U1 also responds to a cycle-off control signal received over the isolation capacitor CFB by switching off the power switch transistor M1. Secondary-side controller U2 may then switch on the SR switch transistor so that the secondary-winding current may flow into the output voltage rail and charge an output capacitor Cout with the output voltage Vout.

Secondary-side controller U2 includes a source terminal (SR_S) for sensing a source voltage Vsr_s of the SR switch transistor. This source voltage ideally is at the same potential as ground for secondary-side controller U2. In addition, secondary-side controller U2 includes a gate (G) terminal for driving the gate of the SR switch transistor to control whether the SR switch transistor is switched on or off. Secondary-side controller U2 also includes a SR D terminal to sense the drain voltage (Vsr_d) of the SR switch transistor. The emulation circuit 105 uses the output voltage Vout and the drain voltage Vds to emulate the primary winding current. Based on the error between the output voltage Vout and a desired Vout and also the emulated primary winding current, secondary-side controller U2 determines the timing of the cycle-on and cycle-off control signals. In addition, secondary-side controller U2 may sense the output current such as through terminals to a sense resistor Rsense to assist in the timing of the cycle-on- and cycle-off control signals. Secondary-side controller U2 may control the cycling of the power switch transistor M1 using any suitable modulation technique such a pulse-width modulation or pulse frequency modulation.

Figure 2A:
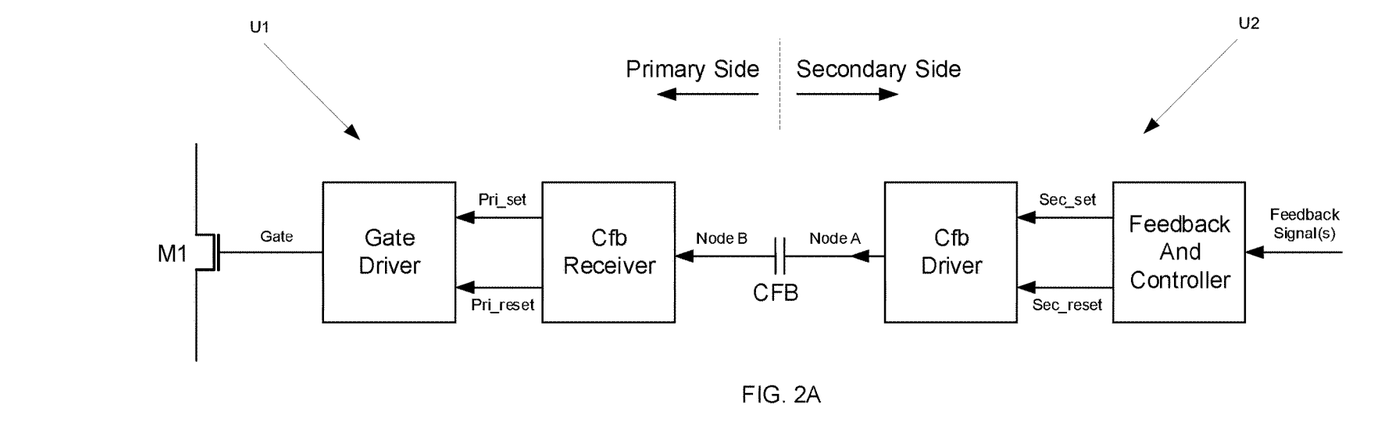
FIG. 2A illustrates aspects of a single-ended control signaling from the secondary-side controller to the primary-side controller.

The cycle-on and cycle-off control signaling from the secondary-side controller U2 to the primary-side controller U1 is further illustrated in FIG. 2A for an implementation using a single isolation capacitor CFB. On the secondary side, the secondary-side control and feedback functionality briefly pulses a secondary-side set signal (Sec_set) when it is desired to switch on the power switch transistor M1. This pulsing is shown occurring at a time t0 in a signal plot shown in FIG. 3. In response to the secondary-side set signal, an isolation capacitor driver in the secondary-side controller U2 pulses a voltage of a first plate (node A) of the isolation capacitor CFB. This pulsing of the node A voltage causes a voltage of a second plate (node B) of the isolation capacitor to briefly spike high at time t0. A CFB receiver in the primary-side controller U1 detects this spiking of the node B voltage as the cycle-on control signal. In response to the spiking of the node B voltage, the CFB receiver asserts a primary-side set signal (Pri_set) that causes a gate driver in the primary-side controller U1 to switch on the power switch transistor M1.

Figure 3:
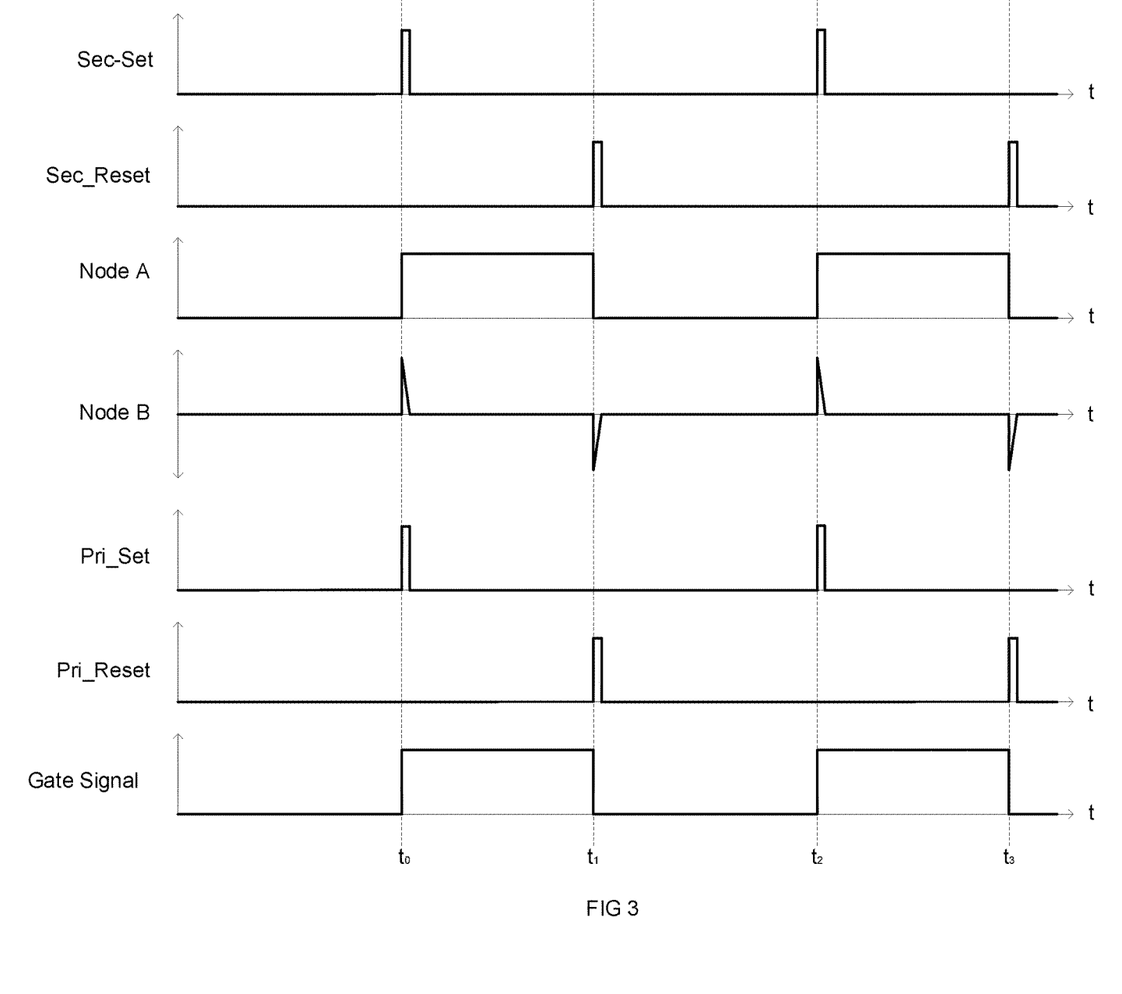
FIG. 3 illustrates some waveforms for the single-ended control signaling of FIG. 2A.

The control and feedback functionality in the secondary-side controller U2 then briefly pulses a secondary-side reset signal (Sec_reset) at a time t1 in response to a determination that the power switch transistor M1 should be cycled off. The isolation capacitor driver then discharges the node A voltage at time t1, which causes the node B voltage to briefly pulse negatively. The CFB receiver responds to this negative pulsing of the node B voltage by briefly pulsing a primary-side reset signal to cause the gate driver to discharge the gate voltage of the power switch transistor M1. The gate voltage (gate signal) of the power switch transistor M1 thus stays charged from time t0 to a time t1. An analogous signaling through the isolation capacitor CFB is then repeated so that the power switch transistor M1 may be cycled on at a time t2 to a time t3.

Figure 2B:
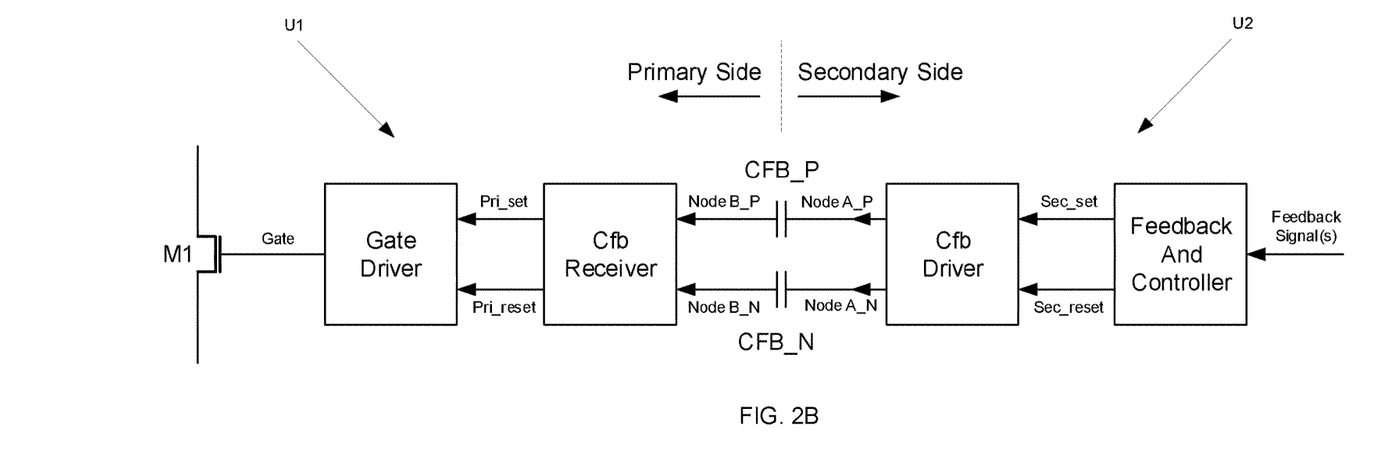
FIG. 2B illustrates aspects of a differential control signaling from the secondary-side controller to the primary-side controller.

To improve the noise immunity, a differential signaling may be used as shown in FIG. 2B. The isolation capacitor CFB discussed with regard to FIG. 2A is replaced by a positive isolation capacitor CFB_P and a negative isolation capacitor CFB_N. These isolation capacitors are then driven differentially in an analogous fashion as discussed with regard to the single-ended driving of isolation capacitor CFB.

Figure 4:
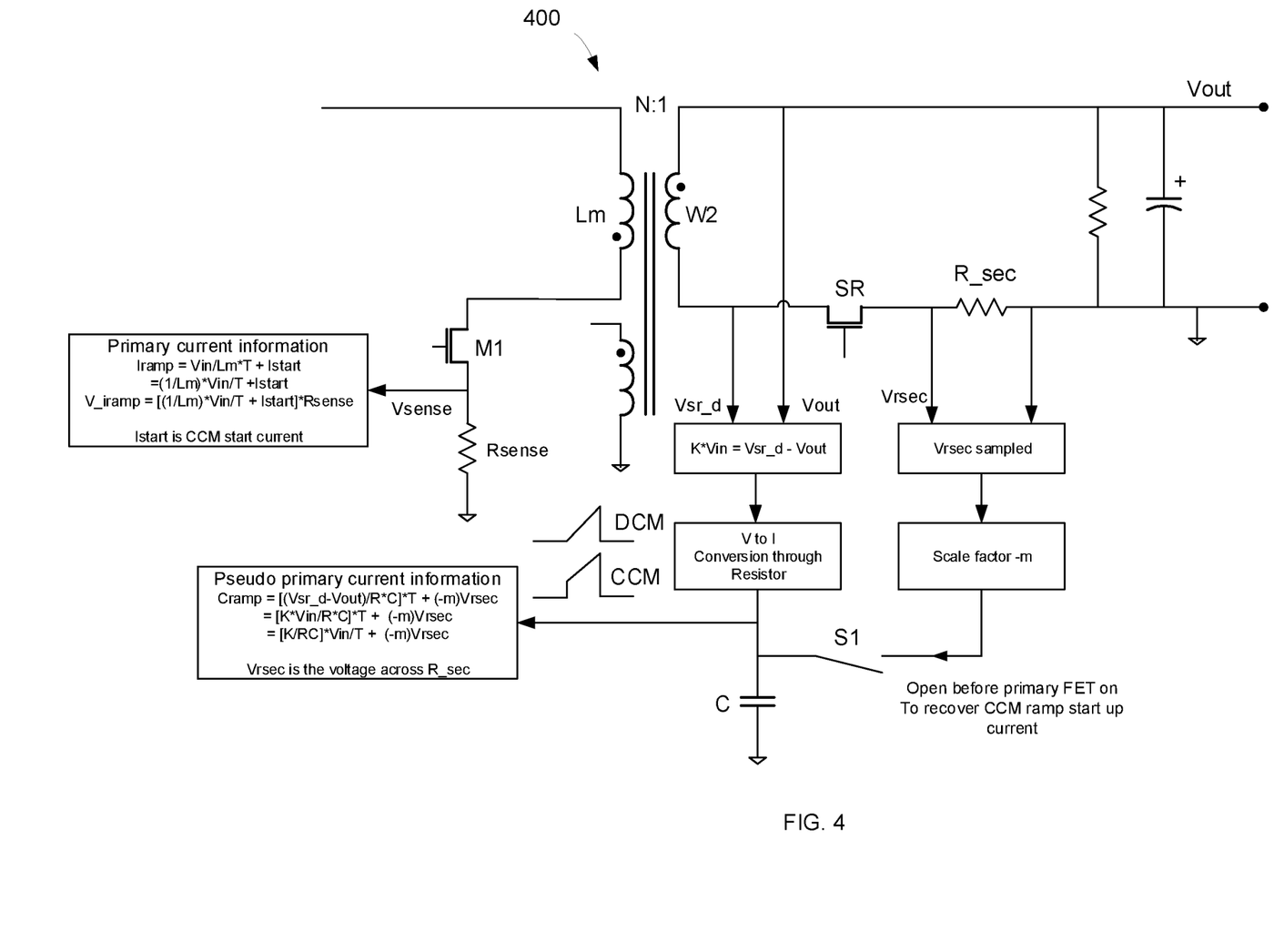
FIG. 4 illustrates a flyback converter with secondary-side control using a secondary-side sense resistor in accordance with an aspect of the disclosure.

An embodiment of the primary winding current emulation that uses a secondary-side sense resistor R_sec is shown in FIG. 4. Referring again to flyback converter 100 of FIG. 1, note that the primary-side controller U1 does not need an auxiliary winding to control the cycling of the power switch transistor due to the secondary-side control. Similarly, the primary-side controller does not need a sense resistor voltage from a primary-side sense resistor coupled between the source of the power switch transistor M1 and ground to control the cycling of the power switch transistor due to the secondary-side control But these components are traditional in primary-side control of the power switch transistor M1 and are thus shown for conceptual purposes in FIG. 4. With regard to this traditional primary-side control, it would be conventional for a primary-side controller to sense the primary-side sense resistor voltage to determine when to switch off the power switch transistor M1. The behavior of the primary-side sense resistor voltage depends upon whether discontinuous conduction mode (DCM) or continuous conduction mode (CCM) operation is active. In DCM, the primary-side sense resistor voltage rises from zero when the power switch transistor M1 is switched on because there is no primary winding current flowing at that time. But in CCM, the primary winding current has a non-zero initial value (Iinitial) when the power switch transistor M1 is switched on. The peak primary-side sense resistor voltage occurs when the power switch transistor M1 is about to be turned off. The on-time period for the power switch transistor may be represented by a variable T. The peak primary-side sense resistor voltage for CCM operation may be shown to equal [(Vin/L)*T+Iinitial)]*Rsense, where Vin is the rectified input voltage, L is the magnetizing inductance of the primary winding, and Rsense is the resistance of the primary-side sense resistor. Note that this equation is also applicable to DCM since Iinitial is zero in that case.

The question thus becomes one of how to emulate this peak primary-side sense resistor voltage in the secondary-side controller U2. At the secondary-side before the power switch transistor M1 is cycled on, the current through the secondary-side sense resistor R_sec and Iinitial are related through the turn ratio of the transformer, which in this embodiment is assumed to be N. To emulate this initial current Iinitial, the secondary-side controller U2 may thus sample a voltage Vrsec across the secondary-side resistor R_sec just prior to switching on the power switch transistor M1. After scaling Vrsec by a factor –m to account for the turn ratio, the secondary-side controller U2 may pre-charge a capacitor C to a voltage of Vrsec*(–m) to model the effects of the initial current Iinitial. For example, the secondary-side controller U2 may include a switch S1 that closes to couple the voltage Vrsec*(–m) to the capacitor C and then opens prior to the power switch transistor M1 on time.

When the power switch transistor M1 cycles on, a difference between the SR switch transistor drain voltage (Vsr_d) and the output voltage Vout is proportional to the input voltage Vin. This difference voltage may be impressed across a resistor R (not illustrated) to form a current K*(Vsr_d–Vout)/R, where K is a proportionality factor. This current may then charge the capacitor C so that the current is integrated over time to emulate the peak primary winding current (which is proportional to the peak primary-side sense resistor voltage). A voltage Cramp across the capacitor C will thus ramp up according to the equation of Cramp=(K/RC)*Vin/T+(–mVrsec). This Cramp voltage emulates or provides an equivalent of the primary-side sense resistor voltage. By monitoring the Cramp voltage, the secondary-side controller U2 may thus determine when the desired peak primary winding current has been reached and command for the power switch transistor M1 to be cycled off accordingly.

Figure 5:
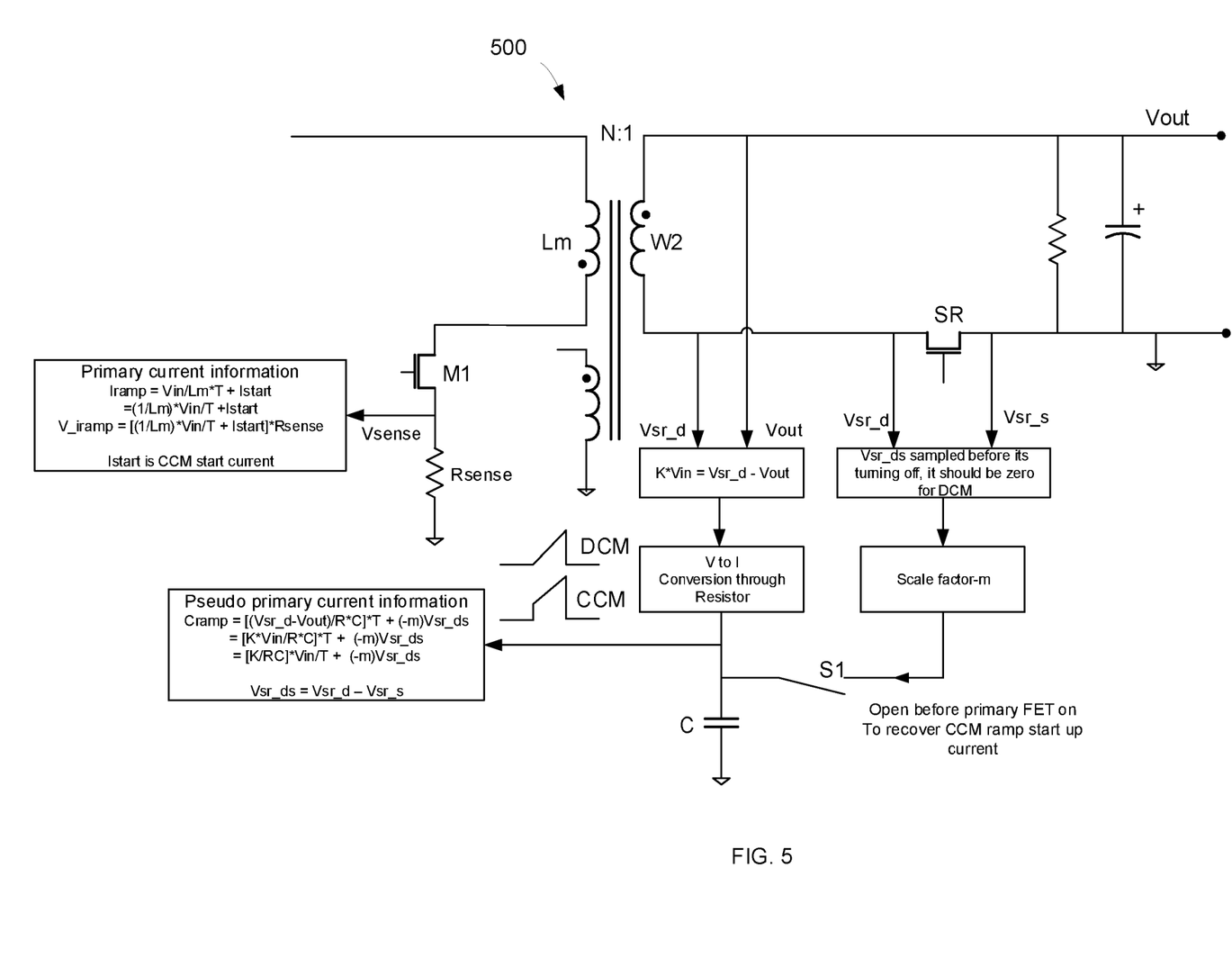
FIG. 5 illustrates a flyback converter with secondary-side control without using a secondary-side sense resistor in accordance with an aspect of the disclosure.

The secondary-side sense resistor R_sec introduces loss. To improve efficiency, it may be eliminated as shown in FIG. 5. In such an implementation, the voltage Vsr_ds across the SR switch transistor may be sampled during CCM operation just before the power switch transistor M1 is switched on. In CCM operation, the primary winding initial current Iinitial is proportional to the voltage Vsr_ds at this sampling time. The voltage Vsr_ds may then be scaled by the factor –m to pre-charge the capacitor C through switch S1 as discussed with regard to FIG. 4. During DCM operation, the SR switch transistor is off prior to when the power switch transistor M1 is cycled on. In response to the SR switch transistor being already switched off prior to the power switch transistor M1 on time, the secondary-side controller U2 may provide a zero initial voltage to the capacitor C. With Cramp set to the initial voltage, the capacitor C may integrate the current (Vsr_d–Vout)/R as discussed with regard to FIG. 4. The Cramp voltage to emulate the peak sense resistor voltage may thus be defined using the equation of Cramp=(K/RC)*Vin/T+(–m)Vsr_ds for embodiments in which the current Iinitial is estimated without a secondary-side sense resistor. Note that the sampling of the Vsr_ds voltage may be implemented in a variety of fashions. For example, the Vsr_ds voltage may be sampled while the SR switch transistor is on, scaled with the factor (–m) and held so as to be applied to the capacitor C after the SR switch transistor switches off. Note that FIGS. 4 and 5 are merely illustrative and that other implementations may be used to emulate the primary winding current. For example, the two components (K/RC)*Vin/T and (–m)Vsr_ds need not be combined but may be applied separately to different nodes of the control loop to emulate the primary winding current.

Figure 6:
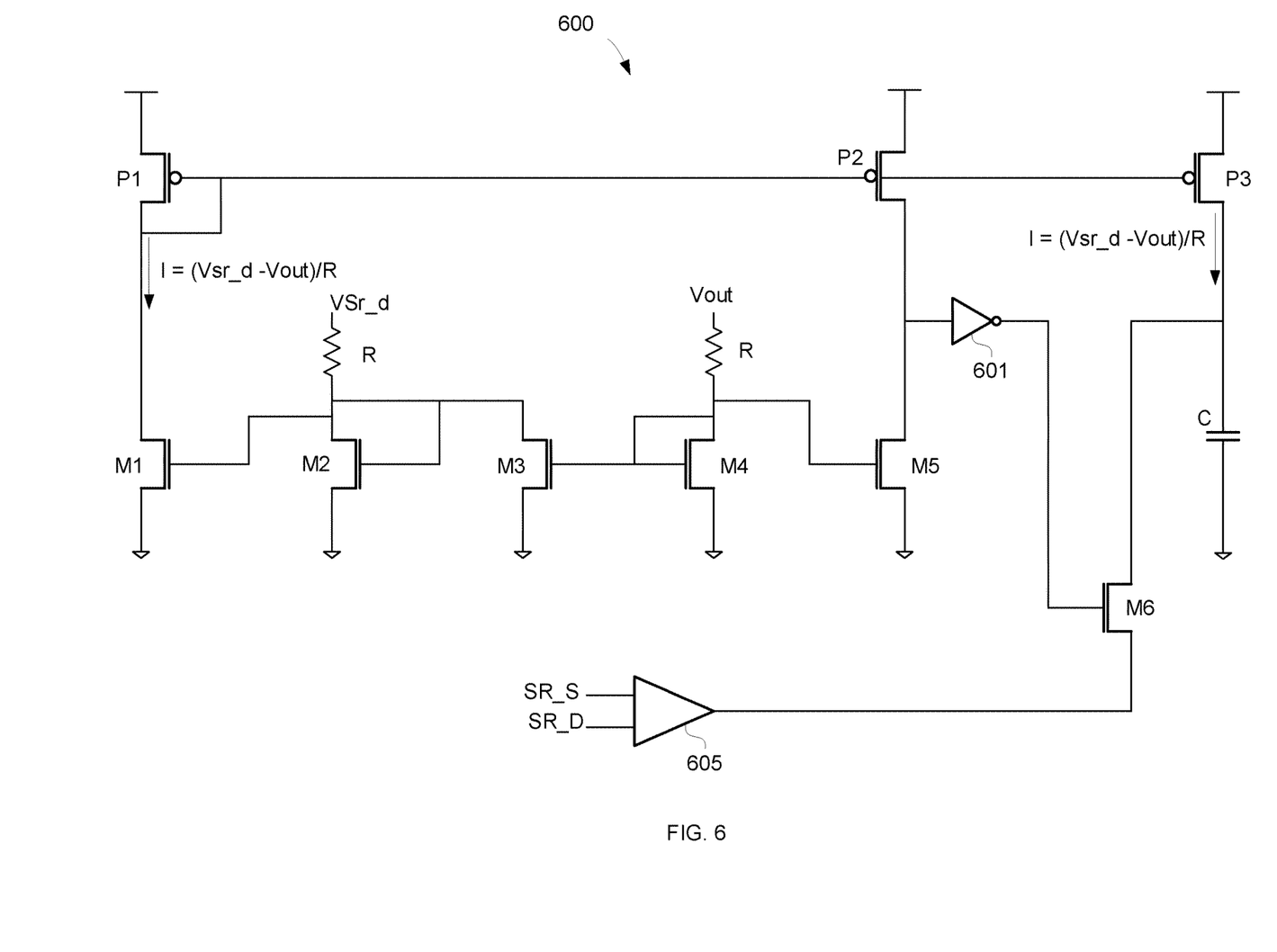
FIG. 6 is a circuit diagram for the primary-winding current emulator in the flyback converter of FIG. 5 in accordance with an aspect of the disclosure.

A circuit implementation 600 for the emulation of the primary winding current without the use of a secondary-side sense resistor is shown in FIG. 6. The output voltage Vout is converted to a current by a resistor R to drive the drain of a diode-connected NMOS transistor M4 that is in a current-mirror configuration with an NMOS transistor M3. The gate of transistor M3 is thus connected to the gate of the diode-connected transistor M4. Both the sources of transistors M3 and M4 are connected to ground. The transistor M3 will thus conduct a mirrored version of the current (Vout)/R. A drain of transistor M3 connects to a drain of a diode-connected transistor M2 having a source connected to ground. The drain voltage Vsr_d of the SR switch transistor is converted into a current (Vsr_d)/R by another resistor R to drive the drain of diode-connected transistor M2. The transistor M2 will thus conduct a difference current of (Vsr_d–Vout)/R. Diode-connected transistor M2 forms a current mirror with another NMOS transistor M1 that has its source connected to ground and a gate connected to a drain/gate of diode-connected transistor M2. Transistor M1 will thus conduct a mirrored version of the current (Vsr_d–Vout)/R.

The drain of transistor M1 connects to a drain of a diode-connected PMOS transistor P1 having a source connected to a power supply voltage node. Transistor P1 forms a current mirror with another PMOS transistor P3 having a drain coupled to ground through a first plate of capacitor C. Transistor P3 will thus conduct a mirrored version of the current (Vsr_d–Vout)/R to charge capacitor C with the Cramp voltage as discussed earlier. To provide the initial charge on the capacitor C, a differential amplifier 605 amplifies the Vsr_ds voltage across the SR switch transistor to charge the first plate of capacitor C1 by a coupling through an NMOS transistor M6. Transistor M6 functions as discussed with regard to switch S1. To switch off transistor M6, diode-connected transistor P1 also forms a current mirror with a PMOS transistor P2. When the power switch transistor M1 is cycled on, transistor P2 will thus conduct a mirrored version of the current (Vsr_d–Vout)/R into a drain of an NMOS transistor M5 that forms a current mirror with diode-connected transistor M4. Depending upon the relative sizes of transistors M5 and P2, the drain voltage of transistor M5 will thus begin to rise when the power switch transistor M1 is cycled on. An inverter 601 couples between the drain of transistor M5 and the gate of transistor M6 so that transistor M6 is cycled off when the power switch transistor M1 is cycled on. Prior to being switched off, transistor M6 will conduct responsive to the output of differential amplifier 605 such that the capacitor C is pre-charged with the initial (–m)Vsr_ds voltage.

Figure 7:
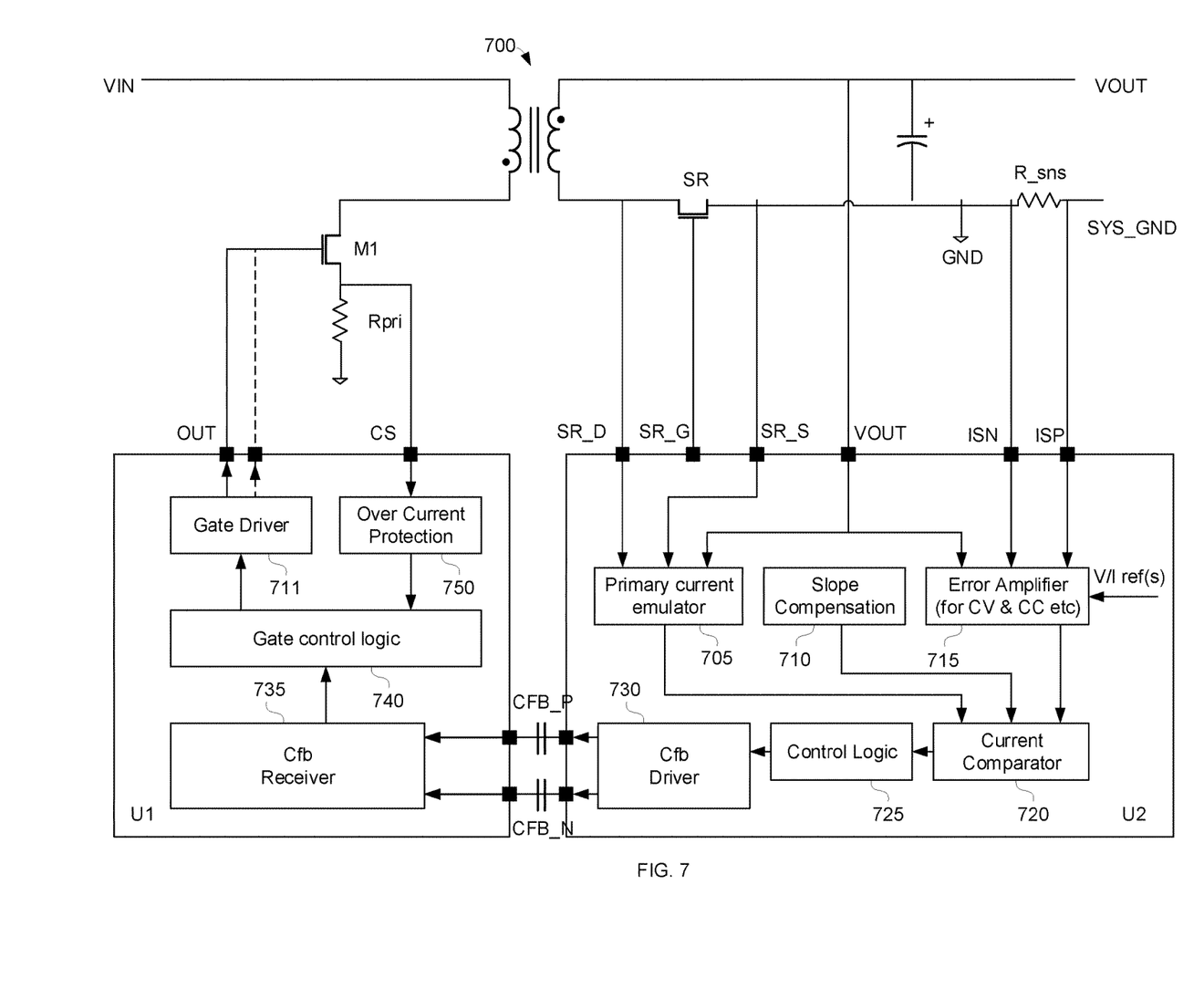
FIG. 7 illustrates a flyback converter with secondary-side control in accordance with an aspect of the disclosure.

A flyback converter 700 with the secondary-side control disclosed herein is shown in more detail in FIG. 7. Although not needed for the secondary-side regulation, a primary-side sense resistor Rpri is included so that primary-side controller U1 may monitor for an overcurrent condition using an overcurrent protection circuit 750. Depending upon the regulation scheme, secondary-side controller U2 may include an oscillator (e.g., included within a control logic circuit 725) that determines the on-time of the power switch transistor M1. A CFB driver 730 in secondary-side controller U2 and a CFB receiver 735 in primary-side controller U1 function as discussed regarding the differential signaling embodiment of FIG. 2B.

Secondary-side controller U2 includes a primary-winding current emulator 705 that emulates the primary winding current as discussed herein. In addition, secondary-side controller U2 includes an error amplifier 715 that generates an error signal depending upon the whether a constant voltage (CV) or a constant current (CC) mode of operation is active. In CV, the error amplifier 715 compares the output voltage Vout to a reference or desired output voltage to generate the error signal. In CC, the error amplifier 715 compare the output current as sensed over a secondary-side sense resistor Rsns. Error amplifier 715 may be configured to integrate and/or filter the error signal so that it may be mapped into a threshold signal representing a threshold current. A comparator 720 compares an emulated signal representing the emulated primary winding current to the threshold signal representing the threshold current. When this comparison indicates that the emulated primary winding current has risen in amplitude to equal the threshold current, the control logic circuit 725 may generate the secondary-side reset signal so that CFB driver 730 may signal the primary-side controller U1 accordingly to switch off the power switch transistor M1. The comparison in comparator 720 may also be adjusted according to a slope compensation 710 to suppress sub-harmonic oscillation and improve control loop stability. In primary-side controller U1, gate control logic 740 responds to the CFB receiver 735 to drive gate driver 711. Should an over-current condition exist, gate control logic 740 may switch off the power switch transistor M1 accordingly.

Those of some skill in this art will by now appreciate that many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

I claim:

1. A secondary-side controller for a flyback converter, comprising:
   a control logic circuit configured to generate a power switch transistor off signal responsive to feedback information;
   an isolation capacitor driver configured to drive an at least one isolation capacitor with the power switch transistor off signal to signal a primary-side controller to switch off a power switch transistor;
   an error amplifier configured to generate a threshold signal, wherein the threshold signal represents the feedback information;
   an emulation circuit configured to generate an emulated signal representing an emulated primary-winding current; and
   a comparator configured to compare the threshold signal to the emulated signal, wherein the control logic circuit is further configured to generate the power switch transistor off signal responsive to the emulated signal rising in amplitude to equal the threshold signal.

2. The secondary-side controller of claim 1, wherein the isolation capacitor driver is configured to drive a single isolation capacitor with the power switch transistor off signal.

3. The secondary-side controller of claim 1, wherein the isolation capacitor driver is configured to drive a pair of isolation capacitors with the power switch transistor off signal.

4. The secondary-side controller of claim 1, wherein the emulation circuit includes:
   a first current mirror configured to conduct a first current proportional to a difference between a drain voltage of a synchronous rectifier switch transistor and an output voltage;
   a second current mirror configured to mirror the first current into a second current; and
   a capacitor configured to be charged by the second current, wherein a voltage of the capacitor forms the threshold signal.

5. The secondary-side controller of claim 4, further comprising:
   a differential amplifier coupled through a switch to the capacitor, the differential amplifier configured to amplify a voltage across the synchronous rectifier switch transistor to provide a pre-charge to the capacitor.

6. The secondary-side controller of claim 4, further comprising:
   a differential amplifier coupled through a switch to the capacitor, the differential amplifier configured to amplify a voltage across a secondary-side sense resistor to provide a pre-charge to the capacitor.

7. The secondary-side controller of claim 6, wherein the pre-charge equals zero volts during a discontinuous conduction mode of operation.

8. The secondary-side controller of claim 1, further comprising:
   an oscillator, wherein the control logic circuit is further configured to generate a power switch transistor on signal responsive to a clock signal from the oscillator.

9. The secondary-side controller of claim 8, wherein the isolation capacitor driver is further configured to drive at least one isolation capacitor with the power switch transistor on signal to signal the primary-side controller to switch on the power switch transistor.

10. A method of secondary-side control in a flyback converter, comprising:
    generating a threshold signal from an error amplifier;
    generating an emulated signal representing an emulated primary-winding current, wherein generating the emulate signal is responsive to a difference between a drain voltage of a synchronous rectifier switch transistor and an output voltage;
    generating a power switch transistor off signal responsive to a comparison of the emulated signal to the threshold signal; and
    transmitting the power switch transistor off signal through at least one isolation capacitor to a primary-side controller.

11. The method of secondary-side control of claim 10, further comprising:
  detecting the transmission of the power switch transistor off signal through the at least one isolation capacitor; and
  switching off a power switch transistor responsive to the detection of the transmission of the power switch transistor off signal.

12. The method of claim 11, further comprising:
  generating a power switch transistor on signal responsive to a clock signal;
  transmitting the power switch transistor on signal through the at least one isolation capacitor; and
  switching on the power switch transistor responsive to the transmission of the power switch transistor on signal through the at least one isolation capacitor.

13. The method of claim 10, wherein transmitting the power switch transistor off signal through the at least one isolation capacitor comprises transmitting the power switch transistor off signal through only one isolation capacitor.

14. The method of claim 10, wherein transmitting the power switch transistor off signal through the at least one isolation capacitor comprises transmitting the power switch transistor off signal through a pair of isolation capacitors.

15. The method of claim 10, wherein generating the emulated signal further responsive to a voltage across a secondary-side sense resistor.

16. The method of claim 10, wherein generating the emulated signal is further responsive to a voltage across the synchronous rectifier switch transistor.

* * * * *